United States Patent Office

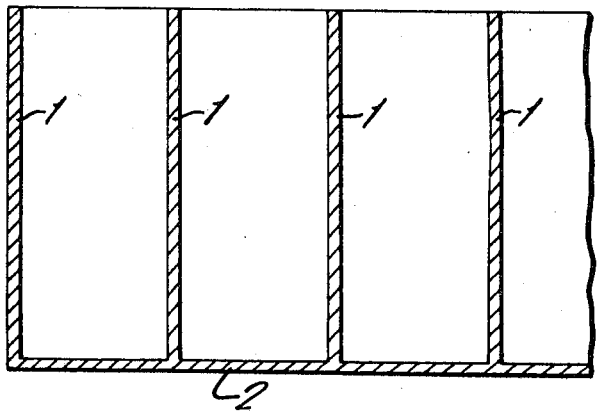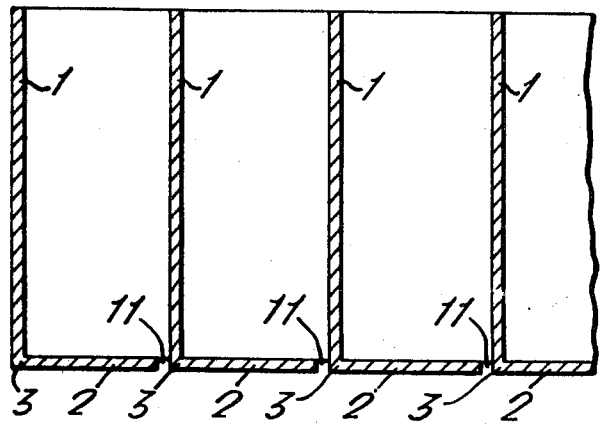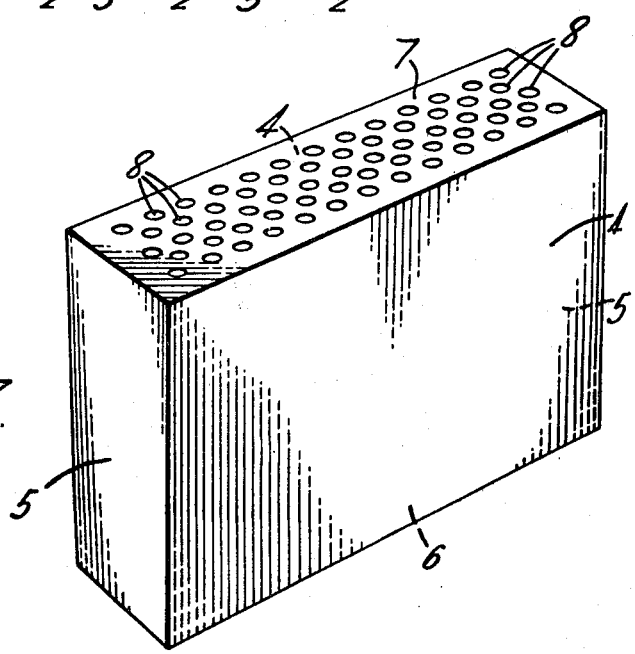

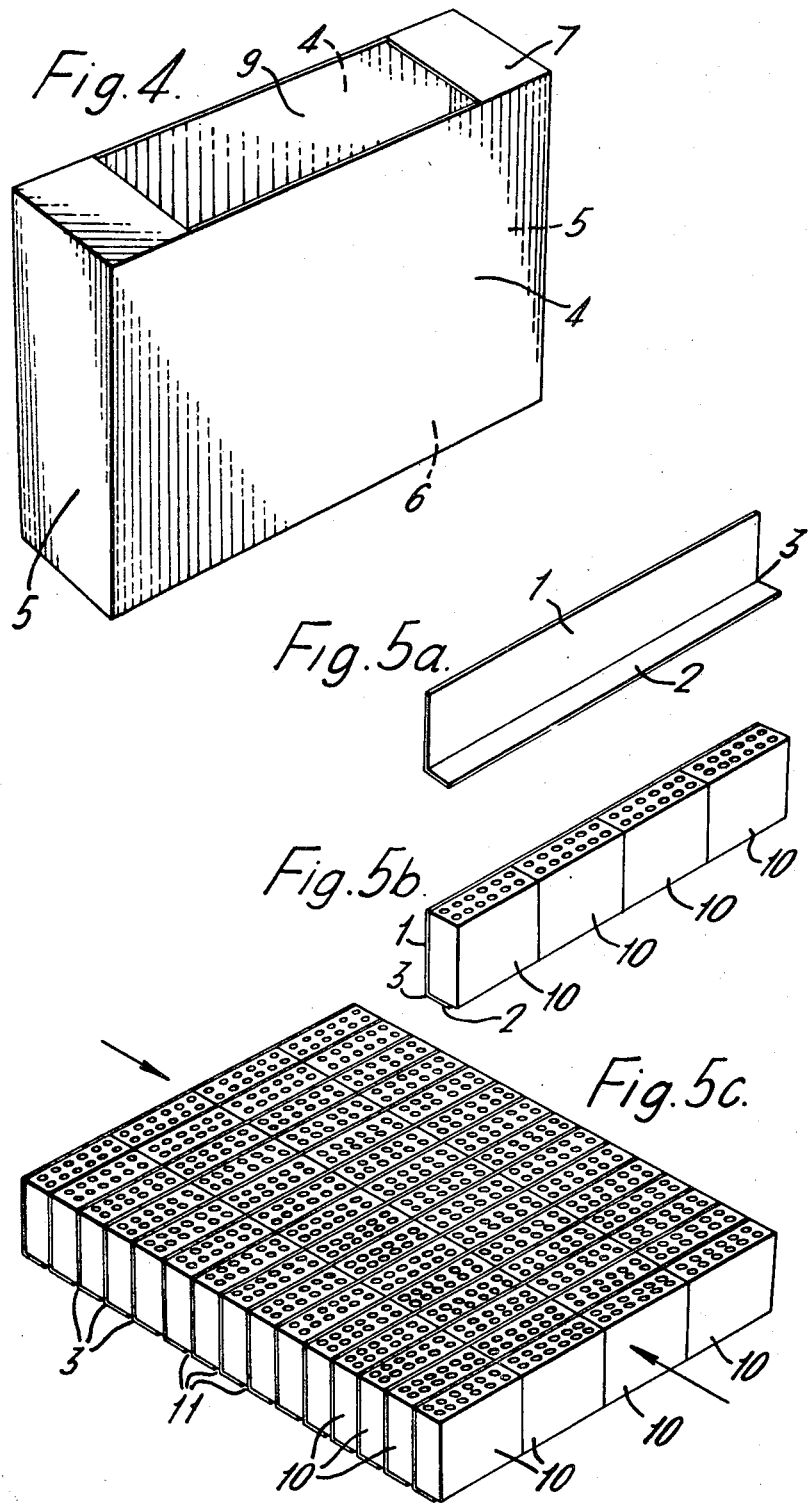

3,391,466
Patented July 9, 1968

3,391,466
FREEZE-DRYING
Johannes Brouwer, Pijnacker, and Jan Veldstra, Duiven, Netherlands, assignors to Unilever N.V., Rotterdam, Netherlands, a company of the Netherlands
Filed Sept. 26, 1966, Ser. No. 582,070
Claims priority, application Great Britain, Sept. 24, 1965, 40,741/65
12 Claims. (Cl. 34—5)

ABSTRACT OF THE DISCLOSURE

A product is freeze-dried in partly opened package container having a pair of planar parallel sides, while the sides are firmly contacted by parallel planar heating elements.

---

The present invention relates to a process and apparatus for freeze-drying.

In the freeze-drying of foodstuffs in bulk the use of so-called "ribbed trays" instead of flat trays on which the foodstuff is loaded has been a distinct improvement. A ribbed tray consists of a flat bottom plate provided with parallel partitions protruding perpendicularly from the bottom plate, which divide the room above the bottom plate into compartments. As the dividing walls are usually of a good heat conducting material such as a suitable metal, heat supplied to the bottom plate will spread quickly to these dividing walls and the effective heating surface will be increased so as to accelerate the freeze-drying process.

However, the loading and unloading of foodstuffs in bulk in the narrow compartments of the ribbed trays is a cumbersome operation, while also the cleaning of the narrow compartments presents difficulties, particularly in the case of products that stick to the walls. Moreover, there are the following problems:

Many freeze-dried products are fragile and friable, and much breakage occurs on emptying the trays and handling the product for weighing and filling into containers. In the case of e.g. onions the fines and dust caused by this breakage may amount to up to 40%. Owing to the high percentage of dust and fines it is difficult to dose the dried product accurately into the containers, and there is much waste.

Another disadvantage is connected with the hydroscopicity of the freeze-dried products, which necessitates the use of air-conditioned rooms in the process of unloading the trays, weighing the product and putting it into the containers after freeze-drying.

The present invention is concerned with mitigating or obviating these disadvantages.

Accordingly the present invention provides a process for freeze-drying a food product in which the product is subjected to freeze-drying while contained in an open package container having at least one pair of parallel walls, during which heat is applied to the product via at least one pair of heating elements having surfaces which are in firm contact with said walls; the dried product subsequently being protected against vapour ingress from the atmosphere if desired, e.g. when the dried product is hygroscopic and will deteriorate soon after taking up moisture.

The heating elements having parallel surfaces may comprise the upstanding ribs of a ribbed tray within which the package container is arranged as a snug fit with the rib surfaces firmly contacting said parallel walls; or the heating elements having parallel surfaces may be formed by a series of plates assembled to simulate a ribbed tray.

In one preferred form the process according to the invention comprises filling the foodstuff into package containers with at least two plane parallel vertical sides, which after the filling operation remain at least partly open at the top, loading the filled package containers in a vertical position into the heating elements, such as ribbed trays (as defined above) in which they snugly fit, subjecting them to freeze-drying conditions, subsequently unloading the package containers from the ribbed trays and treating them in such a way as to make them impervious to water vapour.

One of the advantages of this method of working is that the dosing of the package containers tends to be more accurate, since any deviation from the mean weight during the dosing of the product into the containers before it is dried will be diminished by the drying process, while in some cases at the same time offers the advantage that the freeze-drying operation is accelerated. The freeze-drying in the pack also tends to cause some sintering to occur between the particles, thus diminishing the amount of fine after the transportation of the packages.

Furthermore the process according to the invention can very conveniently be made automatic.

For the purpose of illustrating the invention some preferred forms are shown in the drawings, it being understood, however, that this invention is not limited to the precise arrangements and instrumentalities shown.

FIG. 1 is a partial diagrammatic view of a typical ribbed tray in cross-section suitable for use in the invention as a heating element;

FIG. 2 is a partial diagrammatic view in cross-section of a simulated ribbed tray suitable for use in the invention as an assembled unity of heating elements;

FIG. 3 is a perspective view of a package container for use in the invention;

FIG. 4 is a perspective view of another package container for use in the invention;

FIG. 5a is a perspective view of an L-shaped heating element being part of the simulated tray according to FIG. 2;

FIG. 5b is a perspective view of the L-shaped heating element of FIG. 5a, loaded with a package container of FIG. 3;

FIG. 5c is a perspective view of an assembled unity of L-shaped heating elements loaded with package containers of FIG. 5b.

With reference to the drawings 1 designates the parallel partitions of the tray or L-shaped part of the simulated ribbed tray respectively, protruding perpendicularly from the bottom part 2. Several L-shaped metal heating elements 3 having a partition 1 protruding from the bottom part 2 as shown in single in FIG. 5a, are assembled in line to form a simulated ribbed tray as shown in FIG. 2. Several of these L-shaped metal heating elements 3 loaded with package containers 10 as shown in single in FIG. 5b can be assembled in line to form an assembled unity as shown in FIG. 5c. Generally the height of the package containers will be 2 to 4 times the width and the width will generally be 2 to 4 cm. Furthermore, the general shape of the containers will preferably be a rectangular parallelepiped. The width of the package containers is somewhat greater than the width of the bottom part 2 of each L-shaped heating element, leaving a small margin 11 between the bottom parts of the L-shaped heating elements, assembled in line when the whole assembly loaded with package containers is pressed together in the direction of the arrows.

The package containers may be supplied with a hinged lid, which during the freeze-drying process will be left at least partly open.

A hinged lid may, however, also be dispensed with. In a preferred embodiment the top of the package container may then be completely open, but for ease of handling without spilling any of the contents it is better to have it partly closed. There may be one large opening, preferably symmetrically disposed (see FIG. 4), or several smaller ones, preferably evenly distributed. Also the top may be perforated, with even distribution, preferably throughout the surface, e.g. with round holes or rectangular slits. Preferably at least 20% of the top should be open (see FIG. 3). When the openings are large, their combined surfaces must preferably be a larger percentage of the total surface of the top than when the openings are small. When there is only one large opening (symmetrically placed) the surface of this opening is preferably 70–90% of the total surface of the top. In some cases it is preferred that relatively small holes or slits are used, preferably chosen of such dimensions that the product in the container cannot pass through them. This facilitates handling of the package containers after the freeze-drying step without loss of the contents.

According to the invention the package container can be open on one or on both sides not being the top nor the bottom side or the side walls which are in flat contact with the heating elements, but at the front and/or the back wall and preferably at the upper part of them. Also package containers with openings in the top as well as in one or both of the front and back walls can be used according to the invention.

In the case when the top is perforated the non-dried foodstuffs will not normally be filled through these openings, but the perforations may be in a hinged lid, which is closed after the filling procedure.

After the freeze-drying operation and preferably after unloading the package containers from the heating elements (and as the case may be closing of the lids), if desired the product is sealed off from ingress of vapour, for example by making the package containers impervious to water vapour, e.g. by wrapping them in suitable plastic foil and sealing the wrapping, or by enclosing the package containers in a larger sealed outer package container.

In some cases, such as in the case when e.g. a package container is used according to FIG. 3, the package container can be placed in a substantially horizontal position during the freeze-drying operation.

There is still another important aspect of the invention.

In a particularly convenient form of the invention the ribbed tray is assembled e.g. "in situ" with the package containers during the loading process by horizontal stacking of L-shaped metal sheets in line, between which the package containers are enclosed, snugly fitting within the sheets, which sheets are heated and thus perform the function of heating elements. This may be accomplished e.g. in the following way: the package containers are aligned to the "inner" side of each L-shaped sheet which has been brought into place, after which another L-shaped sheet is pressed into place, with its horizontal leg pointing in the same direction as the horizontal leg of the preceding sheet. Preferably the horizontal legs of the L-shaped sheets are a little bit shorter than the width of the containers, e.g. 0.1–1 mm. shorter (see FIG. 2), so that the vertical legs can be firmly pressed against the two opposite walls of the package containers. This is to ensure a snug fitting of the containers in the compartments formed by the stacked L-shaped sheets and in such a way that a good overall or firm contact is made between two vertical sides of the package containers and the vertical legs of the L-shaped sheets. The heat transmission from the L-shaped sheets to the walls of the package containers is facilitated by a good contact.

The assemblage of the ribbed trays during the loading process facilitates this loading process considerably as well as the unloading after the freeze-drying operation and is particularly convenient for the automation of the production process.

It has been found that under similar conditions of tray temperature and vacuum the "in-pack" freeze-drying process according to the present invention may sometimes take only very little time more than it does when the product is freeze-dried in bulk, i.e. when not prepacked. Even this slight disadvantage can usually be compensated by selecting a slightly higher tray temperature.

The package containers may be made of cardboard, provided for example with a coating (e.g. of wax or plastic) at the inside to prevent moisture from the foodstuff being absorbed by the cardboard and causing unsightly blots. Also aluminium foil may be used or aluminium foil laminated with plastic.

Good results were e.g. obtained with 9 micron thick aluminium foil laminated with 22 micron thick polyethylene foil, and with 30 micron thick aluminium foil laminated with 40 micron thick polyvinyl chloride foil.

Any other material with sufficient rigidity which is not harmful to the foodstuffs may be used.

When the material used for the package containers is in itself impervious to water vapour after packaging, the package containers need not be made impervious all over, e.g. by overall wrapping with foil impervious to water vapour, but only the open side has to be properly sealed.

As a wrapping any film which is impervious to water vapour may be used, e.g. "Saran" film or "Rayseal" (a combination of aluminium foil, paper, wax and silk paper), which can be heat-sealed. The present invention is further elucidated with reference to, though not limited by, the following examples:

Example 1

Deep-frozen shrimps with a dry substance content of 25.6% were, after defrosting at 7° C. for 20 hrs. (water loss 18.8%), weighed into cardboard package boxes (wax-coated on the inside). The dimensions of these boxes were: height 75 mm., length 96 mm., width 30 mm. The top of these boxes had an opening occupying 74% of the total top surface area (as in FIG. 4). In each box were put 114.3 g. of shrimps.

The boxes with shrimps were then placed in aluminium ribbed trays. The distance between the ribs were 30 mm.; the height of the space between the ribs was 75 mm.

The trays with the boxes were subsequently placed in a freeze-drier on heating plates. After closing the freeze-drier, vacuum was applied. The product was frozen by evaporation. As soon as the pressure in the drying room was 0.6 torr (corresponding with a temperature of the ice in the product of —22.5° C.), the temperature of the heating plates was increased to supply heat to the product in order to sublimate the ice. This temperature was adjusted in such a way that no defrosting of the product and no burning of the already dry product occurred.

After a total stay in the freeze-drier of 16 hrs. the average moisture content of the shrimps had decreased to 2%. Vacuum was then released by allowing air into the freeze-drier. The boxes with dry product were taken from the trays and wrapped in "Rayseal" film, which was heat-sealed.

The quality of the dried product was excellent. The product showed no shrinkage or burning.

Example 2

Blanched pieces of asparagus of 9 mm. length were weighed into package-boxes. The dimensions of the boxes were the same as in Example 1. The top of the boxes was provided with perforations (as in FIG. 3). The surface of these perforations was 20% of the total upper surface. The weight of pieces of asparagus per box was 114.3 g. (dry substance content of the product 6.4%).

The product was freeze-dried and wrapped in the same way as in Example 1.

The pressure in the freeze-drier amounted to 0.6 torr.

The drying time of the pieces of asparagus was 26 hours. The moisture content of the dried product was 3.6%.

The quality of the dry product was excellent. The product showed no shrinkage or burning.

Example 3

Fresh onions were peeled, sliced and finally cut into pieces of approximately 3 x 4 x 12 mm. The pieces so obtained were weighed into cardboard boxes (114 g. per box) of the same size and construction as described in Example 1. The solids content of the onions was 12.2%.

The boxes with product were then placed on L-shaped sheets in the freeze-drier. The height of the L-shaped sheets was the same as the height of the boxes. The width of the L-shaped sheets was somewhat (abt. 0.5 mm.) less than the width of the boxes. The L-shaped sheets were assembled on the heating plates of the freeze-drier.

After closing the freeze-drier and activation of the vacuum pumps the product was frozen by evaporation. After reaching a pressure of 0.5 torr (corresponding with a temperature of the ice in the product of −24° C.) the temperature of the heating plates was increased to supply heat in order to sublimate the ice in the product. The degree of heating was adjusted in such a way that no defrosting and no burning took place.

The average moisture content of the product had decreased to 4.3% after 26 hours. The vacuum in the freeze-drier was subsequently released and the boxes were removed. They were finally wrapped in "Saran" film, which was heat-sealed.

The quality of the dried product was excellent. The pieces of onion had a bright white colour and did not show any shrinkage.

Example 4

Blanched sliced mushrooms with a dry matter content of 10.8% were weighed into cardboard package boxes (wax-coated on the inside). The size of these boxes was: height 75 mm., length 96 mm., width 30 mm. The top of these boxes had an opening occupying 74% of the total top surface area. In each box were put 143 g. of blanched mushrooms.

The product was freeze-dried and finally wrapped in "Saran" film, which was heat-sealed.

The pressure in the freeze-drier amounted to 0.5 torr. The drying time of the mushroom slices was 24.6 hours. The moisture content of the dried product was 2.3%. The quality of the dry product was excellent. The product showed no shrinkage or burning.

What is claimed is:

1. A process for freeze-drying a food product comprising the steps of filling package containers having a pair of planar parallel sides with a quantity of the food product, subjecting the product to freeze-drying while the containers are in a partly open condition and the pair of planar parallel sides of the containers are firmly contacted by parallel planar heating elements which thereby supply heat to the product.

2. A process according to claim 1 including the subsequent step of rendering each package container impervious to ingress of water vapour.

3. A process according to claim 2, in which the packages are rendered impervious to ingress of water vapour by being wrapped in water-vapour impervious film material which is subsequently sealed.

4. Process according to claim 1, in which the planar parallel heating elements used are of such a size that the whole surface of each of the pair of planar parallel sides of the package containers is covered.

5. A process according to claim 1, in which the planar parallel heating elements are arranged vertically as a series of upstanding ribs.

6. A process according to claim 5, in which the planar parallel heating elements are formed from upstanding ribs of a deep ribbed tray between which ribs the package containers snugly fit.

7. A process according to claim 5, in which L-shaped heating elements are used which are assembled in rows to form an assembly simulating a deep ribbed tray, between whose ribs the package containers snugly fit.

8. A process according to claim 7, in which the shorter arm of each L-shaped heating element is slightly shorter than the corresponding dimension of the package container inserted between any two such elements.

9. Process according to claim 1, in which the package containers are in the partly open condition by having openings in more than one wall.

10. Process according to claim 1, in which the package containers are in the partly open condition by having openings located in the upper part of at least one of the side walls.

11. Process according to claim 1, in which the package containers are in the partly open condition by having a plurality of openings which are so small that the product in the package container cannot pass through them.

12. A process for freeze-drying a food product comprising the steps of filling the product into package containers with at least two planar parallel vertical sides, which after the filling operation remain at least partly open at the top, loading the filled package containers between a series of vertically upstanding planar parallel heating elements within which they snugly fit, subjecting them to freeze-drying conditions, subsequently unloading the package containers from within the heating elements and treating said package containers in such a way as to make them impervious to ingress of water vapour.

References Cited

UNITED STATES PATENTS

| 3,135,589 | 6/1964 | Stokes | 34—5 |
| 3,238,638 | 3/1966 | Hamilton | 34—5 |

FOREIGN PATENTS

| 981,638 | 1/1965 | Great Britain. |

WILLIAM J. WYE, *Primary Examiner.*